United States Patent
Ngo et al.

(10) Patent No.: US 11,082,254 B2
(45) Date of Patent: Aug. 3, 2021

(54) USER DATAGRAM PROTOCOL TUNNELING IN DISTRIBUTED APPLICATION INSTANCES

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 261 days.

(21) Appl. No.: 16/532,764

(22) Filed: Aug. 6, 2019

(65) Prior Publication Data

US 2020/0053163 A1 Feb. 13, 2020

Related U.S. Application Data

(60) Provisional application No. 62/715,361, filed on Aug. 7, 2018, provisional application No. 62/715,367, filed
(Continued)

(51) Int. Cl.
*H04L 12/46* (2006.01)
*H04L 29/06* (2006.01)
(Continued)

(52) U.S. Cl.
CPC .......... *H04L 12/4633* (2013.01); *G06F 9/547* (2013.01); *H04L 9/088* (2013.01);
(Continued)

(58) Field of Classification Search
CPC ... H04L 12/4633; H04L 63/166; H04L 67/10; H04L 69/16; G06F 9/547
See application file for complete search history.

(56) References Cited

U.S. PATENT DOCUMENTS

| 8,234,702 B2 | 7/2012 | Maes |
| 8,990,901 B2 | 3/2015 | Aravindakshan |

(Continued)

FOREIGN PATENT DOCUMENTS

| EP | 3198464 A1 | 3/2016 |
| WO | 2016049609 A1 | 3/2016 |

OTHER PUBLICATIONS

"DH2i Launches DxOdyssey for IoT, Edge-Optimized Software Defined Permieter (SDP) Solution", Oct. 6, 2020, https://www.prnewswire.com/news-releases/dh2i-launches-dxodyssey-for-iot-edge-optimized-software-defined-perimeter-sdp-solution-301145871.html.*

(Continued)

*Primary Examiner* — Douglas B Blair
(74) *Attorney, Agent, or Firm* — Martensen IP; Michael C. Martensen

(57) ABSTRACT

Network TCP tunnels are dynamically configured to support intra-application connectivity of a distributed application. Tunnel origins listen on each server's loopback address. This listening configuration permits only applications running on the same server to connect. A tunnel gateway application interfaces with the distributed application on each server and includes a tunnel endpoint manager configured to select one or more TCP ports. These selected ports are each associated with a separate TCP listeners. Once associated, data from the instance of the distributed application resident on each of the plurality of servers in the server cluster is routed through these TCP connections and a UDP datagram-orientated communication channel formed between each peer in the server cluster. Each instance of the distributed application can thereafter access peers in the server cluster through each unique UDP datagram-orientated communication channel.

21 Claims, 8 Drawing Sheets

Related U.S. Application Data on Aug. 7, 2018, provisional application No. 62/716,562, filed on Aug. 9, 2018, provisional application No. 62/717,194, filed on Aug. 10, 2018, provisional application No. 62/723,373, filed on Aug. 27, 2018.

(51) Int. Cl.
| | | |
|---|---|---|
| *H04L 29/08* | (2006.01) | |
| *H04L 9/08* | (2006.01) | |
| *G06F 9/54* | (2006.01) | |
| *H04L 12/66* | (2006.01) | |

(52) U.S. Cl.
CPC ............ *H04L 12/66* (2013.01); *H04L 63/029* (2013.01); *H04L 63/166* (2013.01); *H04L 67/10* (2013.01); *H04L 67/141* (2013.01); *H04L 69/16* (2013.01); *H04L 69/162* (2013.01); *H04L 69/326* (2013.01)

(56) References Cited

U.S. PATENT DOCUMENTS

| | | | |
|---|---|---|---|
| 9,037,709 B2 | 5/2015 | Enns | |
| 9,215,131 B2 | 12/2015 | Frey | |
| 9,342,293 B2 | 5/2016 | Enns | |
| 9,467,454 B2 | 10/2016 | Aravindakshan | |
| 9,577,909 B2 | 2/2017 | Li | |
| 9,577,927 B2 | 2/2017 | Hira | |
| 9,661,005 B2 | 5/2017 | Kamble | |
| 10,027,687 B2 | 7/2018 | Kamble | |
| 10,038,669 B2 | 7/2018 | Kizu | |
| 10,348,767 B1* | 7/2019 | Lee | H04L 63/1416 |
| 10,382,401 B1* | 8/2019 | Lee | H04L 67/10 |
| 10,397,189 B1 | 8/2019 | Hashmi | |
| 10,679,039 B2 | 6/2020 | Gallagher | |
| 2003/0088698 A1 | 5/2003 | Singh | |
| 2005/0002412 A1 | 1/2005 | Sagfors | |
| 2005/0163061 A1 | 7/2005 | Piercey | |
| 2006/0029016 A1 | 2/2006 | Peles | |
| 2006/0235939 A1 | 10/2006 | Yim | |
| 2006/0268834 A1 | 11/2006 | Bajic | |
| 2008/0072307 A1 | 3/2008 | Maes | |
| 2008/0291928 A1 | 11/2008 | Tadimeti | |
| 2008/0301799 A1 | 12/2008 | Arnold | |
| 2009/0040926 A1 | 2/2009 | Li | |
| 2009/0138611 A1 | 5/2009 | Miao et al. | |
| 2010/0161960 A1 | 6/2010 | Sadasivan | |
| 2011/0202610 A1 | 8/2011 | Chaturvedi | |
| 2012/0162445 A1 | 6/2012 | Yoon | |
| 2012/0166593 A1 | 6/2012 | Yoon et al. | |
| 2012/0226820 A1 | 9/2012 | Li | |
| 2013/0133043 A1 | 5/2013 | Barkie | |
| 2013/0204988 A1* | 8/2013 | Grewal | H04L 65/105 709/221 |
| 2013/0283364 A1 | 10/2013 | Chang | |
| 2013/0298201 A1 | 11/2013 | Aravindakshan | |
| 2014/0200013 A1 | 7/2014 | Enns | |
| 2014/0207854 A1 | 7/2014 | Enns | |
| 2014/0269774 A1 | 9/2014 | Callard | |
| 2015/0026262 A1 | 1/2015 | Chaturvedi et al. | |
| 2015/0195293 A1 | 7/2015 | Kamble | |
| 2015/0195684 A1 | 7/2015 | Lohmar | |
| 2015/0229649 A1 | 8/2015 | Aravindakshan | |
| 2015/0381484 A1 | 12/2015 | Nira | |
| 2016/0112372 A1 | 4/2016 | Katz | |
| 2016/0337104 A1* | 11/2016 | Kalligudd | H04W 12/033 |
| 2017/0006034 A1* | 1/2017 | Link, II | H04L 61/2514 |
| 2017/0134399 A1 | 5/2017 | Kamble | |
| 2017/0149548 A1 | 5/2017 | Mouhouche | |
| 2017/0223063 A1* | 8/2017 | Herrero | H04L 12/4633 |
| 2017/0237708 A1 | 8/2017 | Klaghofer | |
| 2018/0026811 A1* | 1/2018 | Herrero | H04L 65/80 370/352 |
| 2018/0054388 A1* | 2/2018 | Herrero | H04L 65/80 |
| 2018/0077267 A1 | 3/2018 | Bayer | |
| 2019/0089557 A1 | 3/2019 | Sung | |
| 2019/0182155 A1* | 6/2019 | Chang | H04L 61/251 |

OTHER PUBLICATIONS

PCT/US2019/045425; International Preliminary Report on Patentability; The International Bureau of WIPO; dated Feb. 18, 2021.
PCT/US2019/045430; International Preliminary Report on Patentability; The International Bureau of WIPO; dated Feb. 18, 2021.
PCT/US2019/045431; International Preliminary Report on Patentability; The International Bureau of WIPO; dated Feb. 18, 2021.
PCT/US2019/048355; International Preliminary Report on Patentability; The International Bureau of WIPO; dated Mar. 11, 2021.
Tschofenig, H., et al, "Transport Layer Security (TLS) / Datagram Transport Layer Security (DTLS) Profiles for the Internet of Things," Internet Engineering Task Force (IETF); ISSN 2070-1721; Jul. 2016; http://www.rfc-editor.org/info/rfc7925.
PCT/US2019/045425; International Search Report and Written Opinion of the International Searching Authority; dated Oct. 24, 2019.
PCT/US2019/045431; International Search Report and the Written Opinion of the International Searching Authority; dated Oct. 28, 2019.
Reardon, Joel, et al.; "Improving Tor using a TCP-over-DTLS Tunnel"; May 25, 2009; http://www.cypherpunks.ca/~iang/pubs/TorTP.pdf (15 pages).
PCT/US2019/045430; International Search Report and Written Opinion of the International Searching Authority; dated Oct. 24, 2019.
PCT/US2019/048355; International Search Report and the Written Opinion of the International Searching Authority; dated Oct. 28, 2019.
Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.

\* cited by examiner

USER DATAGRAM PROTOCOL TUNNELING IN DISTRIBUTED APPLICATION INSTANCES

RELATED APPLICATION

The present application relates to and claims the benefit of priority to U.S. Provisional Patent Application Nos. 62/715,361 filed 7 Aug. 2018, 62/715,367 filed 7 Aug. 2018, 62/716,562 filed 9 Aug. 2018, 62/717,194 filed 10 Aug. 2018, and 62/723,373 filed 27 Aug. 2018, all of which are hereby incorporated by reference in their entirety for all purposes as if fully set forth herein. The present application is related to commonly assigned U.S patent application Ser. No. 16/532,677 entitled "SYSTEMS AND METHODS FOR SERVER CLUSTER NETWORK COMMUNICATION ACROSS THE PUBLIC INTERNET" filed 6 Aug. 2019, and application Ser. No. 16/532,727 entitled "APPLICATION TRANSMISSION CONTROL PROTOCOL TUNNELING OVER THE PUBLIC INTERNET" filed 6 Aug. 2019.

BACKGROUND OF THE INVENTION

Field of the Invention

Embodiments of the present invention relate, in general, to communication between distributed applications and more particularly to systems and methods for dynamic configuration of communication between distributed applications using Transmission Control Protocols.

Relevant Background

A server cluster is a set of loosely or tightly connected computers that work together so that, in many respects, they can be viewed as a single system. The components of a cluster are usually connected to each other through Local Area Networks (LANs), with each node running its own instance of an operating system. Clusters are typically deployed to improve performance and availability over that of a single computer and are normally more cost-effective than single computers of comparable speed or availability. And since most clusters operate inside a LAN they can freely communicate avoiding security concerns present with interaction of the public Internet.

In the normal operation of Transmission Control Protocols ("TCP")/Internet Protocol ("IP") suite of communication protocols, as depicted in FIG. 1, a client application 120 resident on client A 110 having IP address A, requests a new connection to the server application 140 to resident on server B 130 having IP address B. Every device connected to a network must have a unique IP address to differentiate it from the others. An IP address is similar to the unique telephone number on your home phone or mobile device. The difference is that it consists of four segments called octets that are separated by a period. An IPv4 address is a 32-bit integer value, most often written in the dot-decimal notation, which consists of four octets of the address expressed individually in decimal numbers and separated by periods (for example, 11.22.333.444). Typically, communication with a server is on server application TCP port 8080. In this instance server B 130 observes a connection request from client A 110 on IP address A.

Traditional clustering software is intended to be deployed on a well-controlled LANs for two reasons. First and expressed above, vendors consider software on a LAN to be secure or at least more secure than to provide direct access to their software or services over the public Internet. Second, Individual layer-4 (TCP and UDP) communication channels required for traditional clustering software to function are diverse and are easier to manage inside a LAN.

No other device on a network, unless you are using network address translation, will have the same IP address. Therefore, for a device to communicate with another, the sending device must know the location of the destination before it can begin transmitting data. Depending on the locations (address) of the source and destination devices as they relate to the subnet mask, the process of discovering the location of the destination device address will vary.

To span clusters across multiple LANs via the public Internet vendors predominately use of dedicated Virtual Private Networks or VPNs as depicted in FIGS. 1b and 1c, for both security, and to provide an unrestricted layer-3 network path between servers to support the diverse set of required layer-4 communication channels.

A VPN is a secure tunnel through which communication and data can flow between two points securely. Recall that the Internet is a packet-switched network meaning there is no single, unbroken connection between sender and receiver. Instead, when information is sent, it is broken into small packets and sent over many different routes to the same location at the same time, and then reassembled at the receiving end. This is opposed to circuit-switch network such as the telephone system which, after a call is made and the circuits are switched, carve out part of the network for a single direct connection.

Every packet transmitted on the Internet carries information to direct the packet to its location and how it is to be used. For example, some packets may be used to form a website using Hypertext Transfer Protocol, (HTTP) while others may use Internet Message Access Protocol (IMAP) for accessing email. Certainly, each packet needs to know to what address it is being sent and who is the sender. The Transmission Control Protocol (TCP) and the Internet Protocol (IP) are the most common set of protocols for breaking down and reassembling packets.

The TCP/IP model is broken into four layers that address the problem of breaking up data into packets, sending them across the Internet and reassembling them at their destination. These layers include the application, transport, internet, and network access layers. The network access layer is responsible for converting binary data to network signals. This includes the network card on a computer or modem that converts computer friendly data to network friendly signals. The internet layer provides logical addressing, path determination and forwarding.

The application layer comprises various protocols that govern the interaction with an application, data translation, encoding, dialogue control can communication coordination between systems. There are numerous application protocols with some of the more common being HTTP, IMAP, File Transfer Protocol (FTP), Simple Mail Transfer Protocol (SMTP), Domain Name Service (DNS) and the like.

The transport layer is concerned with end-to-end transportation of data and sets up a logical connection between hosts. Two protocols available in this layer are TCP and User Datagram Protocol (UDP). While TCP is a connection orientated and reliable using windowing to control the ordered flow and delivery of data segments, UDP simply transfers data without the bells and whistles providing faster delivery of data albeit less reliable.

In a VPN, each packet of a message is encrypted and then encapsulated inside a normal TCP IP packet for transportation. These normal IP packets include a destination address at the other end of the tunnel at which the encapsulated packets are delivered. So as the packets move through the Internet the true address of the encapsulated packets cannot be read, only the tunnel address is accessible.

At the receiving end the computer or router strips off the exterior IP packet and decrypts the interior packet. Based on that information the interior packet is delivered to the destination. This process requires 4 layers of communication channels to affect the secure delivery of data and these layers come at a cost. At its core, a VPN protocol is basically a mix of transmission protocols and encryption standards.

Tunneling, generally, is a communications protocol that allows for the secure movement of data from one network to another but is not without its problems. It involves allowing private network communications to be sent across a public network, such as the Internet, through encapsulation as described above. A tunneling protocol may, for example, allows a foreign protocol to run over a network that does not support that particular protocol, such as running IPv6 over IPv4. Another important use is to provide services that are impractical or unsafe to be offered using only the underlying TCP/IP network services, such as providing a corporate network address to a remote user whose physical network address is not part of the corporate network. Because tunneling involves repackaging the traffic data into a different form it can hide the nature of the traffic that is run through a tunnel.

Tunneling protocol works by using the data portion of a packet (the payload) to carry the packets that actually provide the service. Tunneling uses a layered protocol model such as those of the TCP/IP protocol suite, but usually violates the layering when using the payload to carry a service not normally provided by the network. Typically, the delivery protocol operates at an equal or higher level in the layered model than the payload protocol.

Unfortunately, tunneled IP traffic may not receive the intended level of inspection or policy application by network-based security devices unless such devices are specifically tunnel aware. This reduces defense in depth and may cause security gaps. This applies to all network-located devices and to any end-host-based firewalls whose existing hooking mechanism(s) would not show them the IP packet stream after the tunnel client does decapsulation or before it does encapsulation. Moreover, IP addresses inside tunnels are not subject to ingress and egress filtering in the network they tunnel over, unless extraordinary measures are taken. Only the tunnel endpoints can do such filtering which limits security.

Other problems with tunnels include NAT holes as well as the possibility that the tunnel address can be surmised. Indeed, target addresses can be profiled as the address reveals some information as to the nature of the client. A need therefore exists to create a more secure means by which to communicate between servers in a network environment, especially when such servers are associated in a server cluster.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A technique for dynamically configuring network tunnels, specifically TCP tunnels, along with specific distributed applications to support intra-application connectivity of said distributed applications, is hereafter described by way of example. The present invention configures each instantiation of a distributed application to listen on the loopback address as associated with a tunnel gateway application. This permits only applications running on the same server to connect to them, i.e. applications running on servers elsewhere on the network will be unable to connect to the distributed application listeners. Requiring the distributed application listeners to accept connections from a locally running application, and only that application, and use of loopback listeners makes the system of the present invention more secure.

In one embodiment of the present invention, a system for intra-application connectivity of distributed applications over a wide area network includes a plurality of servers operating as a server cluster, wherein each server includes a tunnel gateway application. Each tunnel gateway application further includes a plurality of Terminal Control Protocol (TCP) listeners that are coupled to other instantiations of the distributed application through a loopback address.

A separate instance of the distributed application is instantiated on each of the plurality of servers in the cluster and that instance communicates with a tunnel gateway application resident on that server through a direct layer-4 TCP network route. Client application data from the distributed application is conveyed to the tunnel gateway application using a TCP transport suitable format via this route.

Each instantiation of the distributed application is moreover communicatively coupled to each other instantiation of the distributed application through its tunnel gateway application using a TCP listener and a loopback port assigned to the application instance on each server. The TCP listeners accept connections from only local instantiations of the distributed application, and each loopback port at each server is configured to be exclusively available to the instance of the distributed application on that server. Once assigned, a User Datagram Protocol (UDP) datagram-orientated communication channel is used to exchange data between each tunnel gateway application.

Each tunnel gateway application is configured to modify client application data from the TCP transport suitable format received from each distributed application instance to a UDP transport suitable format for conveyance over the wide area network.

In one version of the present invention the tunnel gateway application includes a tunnel endpoint manager configured to select one or more TCP ports and associate each selected port with one of the plurality of TCP listeners and route each associated TCP listener/TCP Port pair to a unique instance of the distributed application.

In another embodiment of the present invention a method for intra-application connectivity of distribute applications over a wide area network includes operating a server cluster formed from a plurality of servers wherein each sever includes a tunnel gateway application and wherein each tunnel gateway application includes a plurality of Terminal Control Protocol (TCP) listeners The method continues by instantiating, on each of the servers in the server cluster, a separate instance of a distributed application wherein each separate instance of the distributed application communicates with the tunnel gateway application resident on that server through a direct layer-4 TCP network route. Client application data is thereafter conveyed to the tunnel gateway application on each server using a TCP transport suitable format.

Each instantiation of the distributed application is communicatively coupled to each other instantiation of the distributed application at each tunnel gateway application by using a TCP listener through a loopback port assigned to the application instance on each server. Lastly client application data is transported between each tunnel gateway application over the wide area network through a User Datagram Protocol (UDP) datagram-orientated communication channel.

The aforementioned methodology can be embodied as instructions and stored on a non-transitory machine-readable storage medium that, when executed by at least one machine, enable intra-application connectivity of distribute applications over a wide area network.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
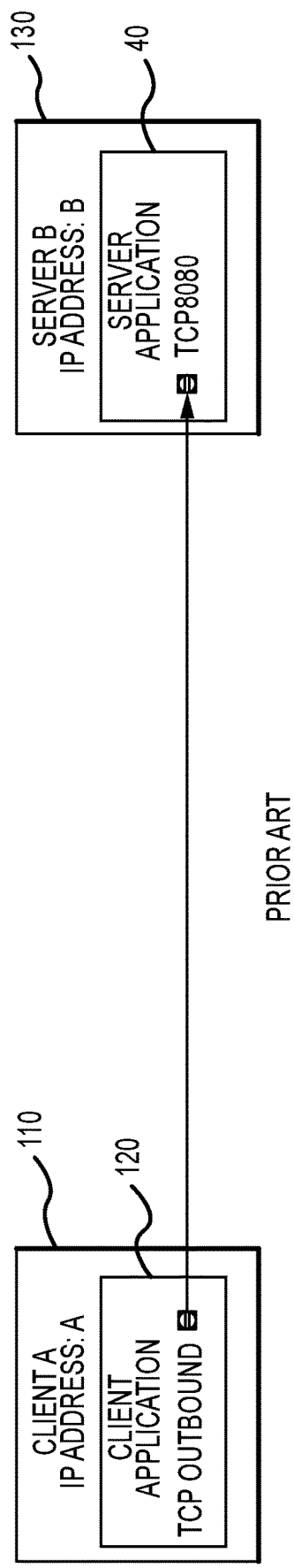
FIG. 1 depicts an internal LAN client-to-server connection using a Transmission Control Protocols ("TCP")/Internet Protocol ("IP") suite of communication protocols.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Network TCP tunnels are dynamically configured to support intra-application connectivity of a distributed application. The present invention configures tunnel origins to listen on each server's loopback address. This listening configuration permits only applications running on the same server to connect to them, i.e. applications running on servers elsewhere on the network (be they within a local area network or otherwise) are unable to connect to the tunnel origin listeners. Requiring tunnel origin listeners is to accept connections from a locally running application, and only that application, makes the system more secure.

A tunnel gateway application interfaces with the distributed application on each server and includes a tunnel endpoint manager configured to select one or more TCP ports. These selected ports are each associated with a separate TCP listener. Once associated, data from the instance of the distributed application resident on each of the plurality of servers in the server cluster is routed through these TCP connections and a UDP datagram-orientated communication channel formed between each peer in the server cluster. Each instance of the distributed application can thereafter access peers in the server cluster through each unique UDP datagram-orientated communication channel.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

For the purpose of the present invention the following acronyms shall be understood to mean:

IP—Internet Protocol. Occupies layer-3 in the OSI model. Can refer to IPv4 or IPv6. The Internet Protocol is responsible for ensuring packets are sent to the correct destination.

IPv4—Internet Protocol version 4, with a 32-bit address space

IPv6—Internet Protocol version 6, with a 128-bit address space

ISP Internet Service Provider

OSI Model—Open Systems Interconnection model, a standard characterization of functional layers of networking using seven layers as opposed to the four layers of the TCP model.

NAT—Network Address Translation, a technology used prolifically to connect local area networks to the public Internet. NAT enables a plurality of servers (computers) to interact with the public internet via a single external IPv4 address.

Port Forwarding—A technique provided by most. NAT routers to allow connections from the public Internet to an internal server TCP/IP Transmission Control Protocol/Internet Protocol, is a suite of communication protocols used to interconnect network devices on the Internet. Transmission Control Protocol is a stream-oriented, reliable-delivery data transfer protocol. TCP provides a communication service at an intei mediate level between an application program and the Internet Protocol. It provides host-to-host connectivity at the transport layer of the Internet model. An application does not need to know the particular mechanisms for sending data via a link to another host, such as the required IP fragmentation to accommodate the maximum transmission unit of the transmission medium. At the transport layer, (layer 4 in the OSI model) TCP handles all handshaking and transmission details and presents an abstraction of the network connection to the application typically through a network socket interface.

Tunnel or Tunneling Protocol (also referred to herein as a channel) In computer networks, a tunneling protocol is a communications protocol that allows for the movement of data from one network to another. It involves allowing private network communications to be sent across a public network (such as the Internet) through a process called encapsulation. Because tunneling involves repackaging the traffic data into a different form, perhaps with encryption as standard, it can hide the nature of the traffic that is run through a tunnel. The tunneling protocol works by using the data portion of a packet (the payload) to carry the packets that actually provide the service. Tunneling uses a layered protocol model such as those of the OSI or TCP/IP protocol suite.

Port—A Port is opening on a machine through which data can flow.

UDP—User Datagram Protocol, a not-necessarily-in-order datagram delivery protocol, used over IP. UDP uses a simple connectionless communication model with a minimum of protocol mechanisms. UDP provides checksums for data integrity, and port numbers for addressing different functions at the source and destination of the datagram. UDP does not use any handshaking dialogues, and thus exposes the user's program to any unreliability of the underlying network. Occupies layer-4 in the OSI model.

GRE—Generic Routing Encapsulation, a simplified datagram-oriented protocol used by certain VPNs to exchange layer-2 or layer-3 traffic. GRE itself may be considered layer-4 in the OSI model, as it sits above layer-3 protocols, but is considered to break the layering order by containing messages from lower layers.

Host Networking Stack—The primary network state machine running on a server or any other networked computer. Typically part of the operating system kernel. Provides layer-4 socket services for TCP and UDP protocols, as well as state machines for layer-3 protocols such as IPv4/IPv6, layer-2 protocols, network hardware drivers, and virtual network drivers for VPNs.

LAN—Local area network

WAN—Wide Area Network, a network that typically connects distant sites to one another or to the public Internet VPN—Virtual Private Network. A layer-2 or layer-3 networking technology that allows local networks to be securely extended or bridged over WANs, such as the public Internet.

TLS—Transport Layer Security, method for establishing private, authenticated communication channels over stream-oriented communication channels such as TCP.

DTLS—Datagram Transport Layer Security, method for establishing private, authenticated communication channels over non-reliable, out-of-order datagram communication channels such as UDP.

Transport Layer Security. A method for establishing private, authenticated communication channels over stream-oriented communication channels such as TCP.

Socket—A network Socket is an endpoint instance, defined by a hostname or IP address and a port, for sending or receiving data within a node on a computer network. A socket is a representation of an endpoint in networking software or protocol stack and is logically analogous to physical female connections between two nodes through a channel wherein the channel is visualized as a cable having two mail connectors plugging into sockets at each node. For two machines on a network to communicate with each other, they must know each other's endpoint instance (hostname/IP address) to exchange data Loopback Address—A loopback address sends outgoing signals back to the same computer for testing. In a TCP/IP network, the loopback IP address is 127.0.0.1, and pinging this address will always return a reply unless the firewall prevents it. A Loopback is, therefore, a communication channel with only one endpoint. TCP/IP networks specify a loopback that allows client software to communicate with server software on the same computer. Users can specify an IP address, usually 127.0.0.1, which will point back to the computer's TCP/IP network configuration. The range of addresses for loopback functionality is the range of 127.0.0.0 to 127.255.255.255. Similar to a ping, loopback enables a user to test one's own network to ensure the IP stack is functioning properly.

TCP Listener—A TCP Listener is the server-side counterpart of a TCP connection. It is used to accept incoming connections over TCP.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Figure 2:
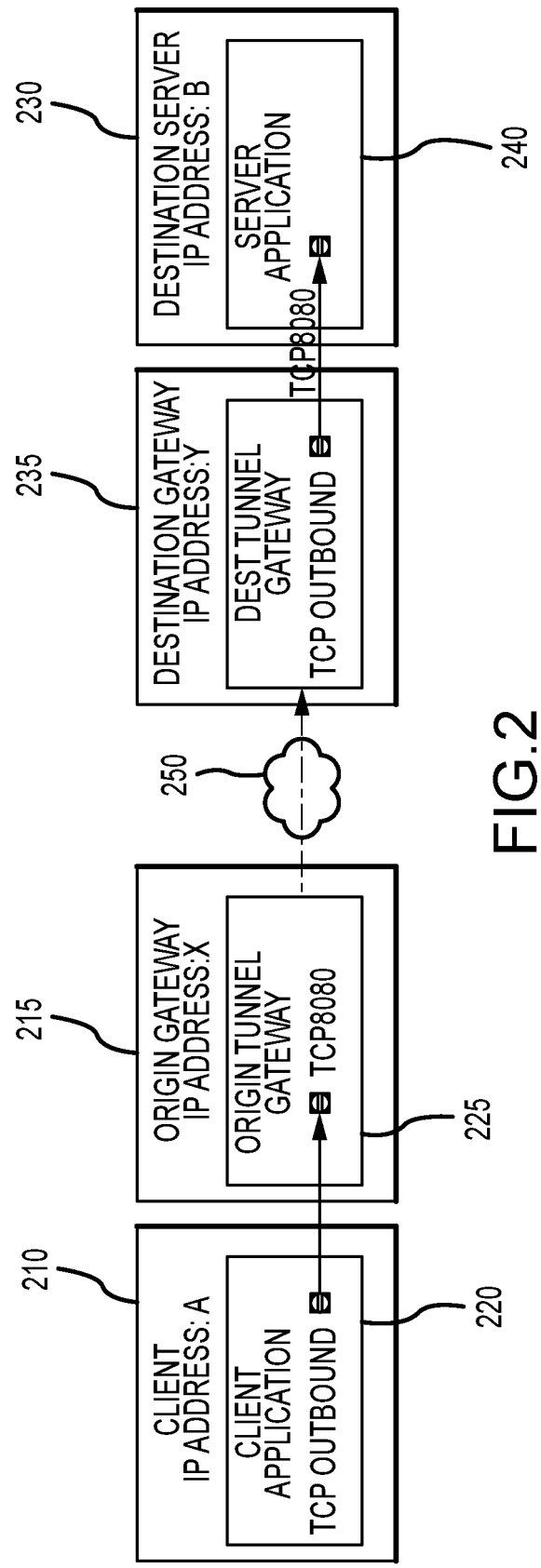
FIG. 2 shows a client-to-server connection using a TCP/IP suite of communication protocols, origin and destination gateways, and a User Datagram Protocol ("UDP") tunnel, according to one embodiment of the present invention.

FIG. 2 shows a client-to-server connection using a TCP/IP suite of communication protocols, origin and destination gateways, and a User Datagram Protocol ("UDP") tunnel, according to one embodiment of the present invention. At a high level, a client application 220 resident on a client server 210 with IP address A is seeking to communicate with a server application 240 resident on destination server 230 having an IP address B.

Using TCP connection tunneling two intermediate gateways, an origin gateway server 215 and a destination gateway server 235, provide an indirect method for the client application 220 to connect to the server application 240. To use TCP connection tunneling according to the present invention, the client application 220 requests a new TCP connection to the origin tunnel gateway application 225 on IP address X, on the origin tunnel gateway application port 8080. The origin tunnel gateway application 225 thereafter contacts the destination tunnel gateway application 245 using a design-specific UDP communication channel 250, and requests that a new tunnel connection be established to the server application 240.

On behalf of the new tunnel connection to the server application, the destination tunnel gateway application 245 resident on the destination gateway server 255 initiates a TCP connection to the destination server 230 using IP address B, on port 8080. The destination server application 240 observes a connection request from IP address Y (the IP address of the destination gateway server) and if the connection process is successful, the intermediate tunnel gateways will exchange data payloads received from each side of the tunnel, so as to behave as though the client application 220 and server application 240 are directly connected.

TCP connection tunneling as describe above is useful in situations where the client application and server application reside on different hosts that cannot directly address each other via layer-3 Internet Protocol. In order to facilitate connection tunneling, a communication mode between intermediate tunnel gateways must be established—typically through narrow channels, such as a single TCP connection or UDP message channel through a remapped IP address and TCP or UDP port.

Recall, a distributed application, for the purpose of this invention, refers to a software application with components running on multiple servers connected by a network, which communicate amongst themselves using TCP. Distributed applications also typically communicate with other components that are not considered part of the distributed application, sometimes referred to as client applications, but this connectivity is beyond the scope of the invention, and is not discussed further. Distributed applications can have homogeneous components and/or heterogeneous components. Homogeneous components are capable of fulfilling the same roles and capabilities, and typically connect to each other in a peer-to-peer fashion. An example of a purely homogeneous distributed application is Microsoft SQL Server, with the Availability Groups feature enabled, which uses the TCP connections for replication of database contents and changes to databases. Heterogeneous components have different roles with different connectivity patterns, but all are considered part of the distributed application.

Figure 3A:
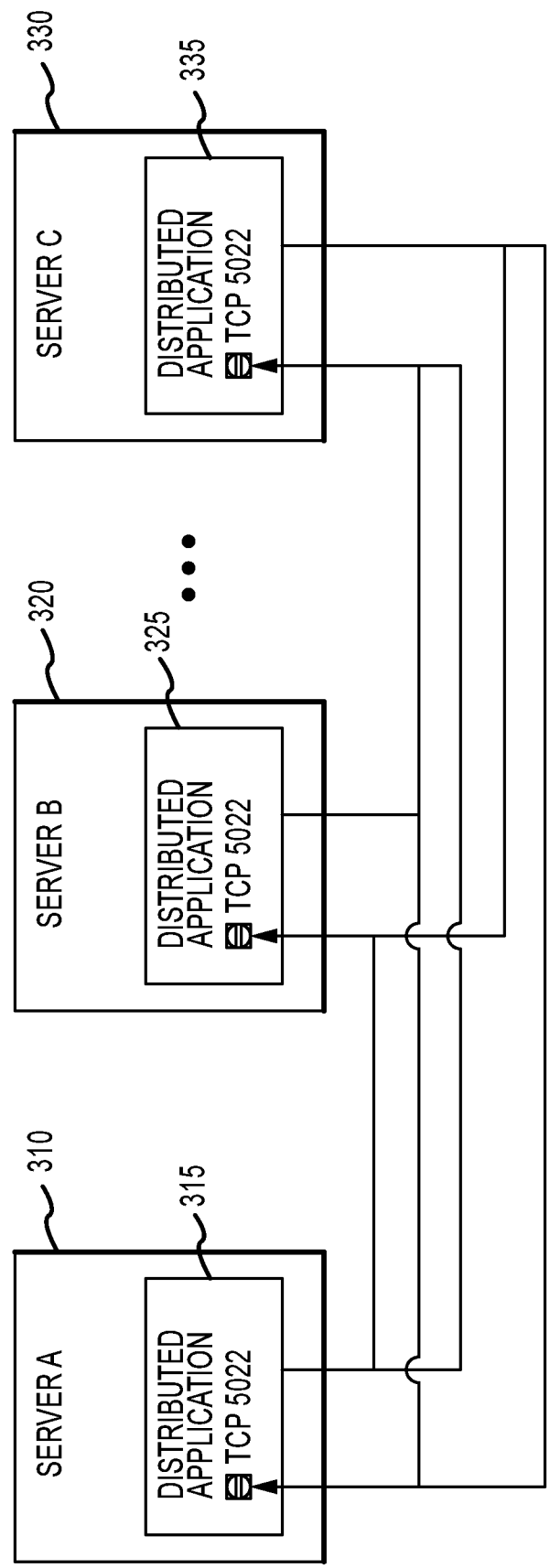
FIG. 3a illustrates a distributed application server cluster operating in a server cluster connected directly over a local area network using TCP/IP communication protocols.

FIG. 3a depicts a typical configuration of a three-node homogeneous peer-to-peer distributed application involving three servers 310, 320, 330, each running an instance of the same software (distributed) application 315, 325, 335. Each instance of the software application 315, 325, 335 is configured to operate as one member of a three-node cluster, and to connect directly to its two peers via TCP, using their IP addresses on the local network. In this example each instance of the distributed application 315, 325, 335 is connected to the other instances on TCP Port 5022.

A similarly functioning system, but one in which the servers are coupled via a public Internet (see FIG. 3*b*), can be established through the use of TCP tunnels. One embodiment of the present invention establishes such connectivity by first creating a system of TCP tunnels on each server using a Tunnel Application Gateway 318, 328, 338. This system of TCP tunnels allows each instance of the application 315, 325, 335 to connect to its counterpart instantiations on each other server in the cluster. The tunnels, in this example, are configured to listen on TCP ports selected by the present invention after determining that they are not in use by other applications. The present invention thereafter configures each distributed application instance 315, 325, 335, instead of connecting to its named peer directly, to connect to TCP listener(s) associated with tunnels on a tunnel gateway application 318, 328, 338 respectively, which thereafter connect to each other instantiation of the distributed application in the server cluster.

Figure 3B:
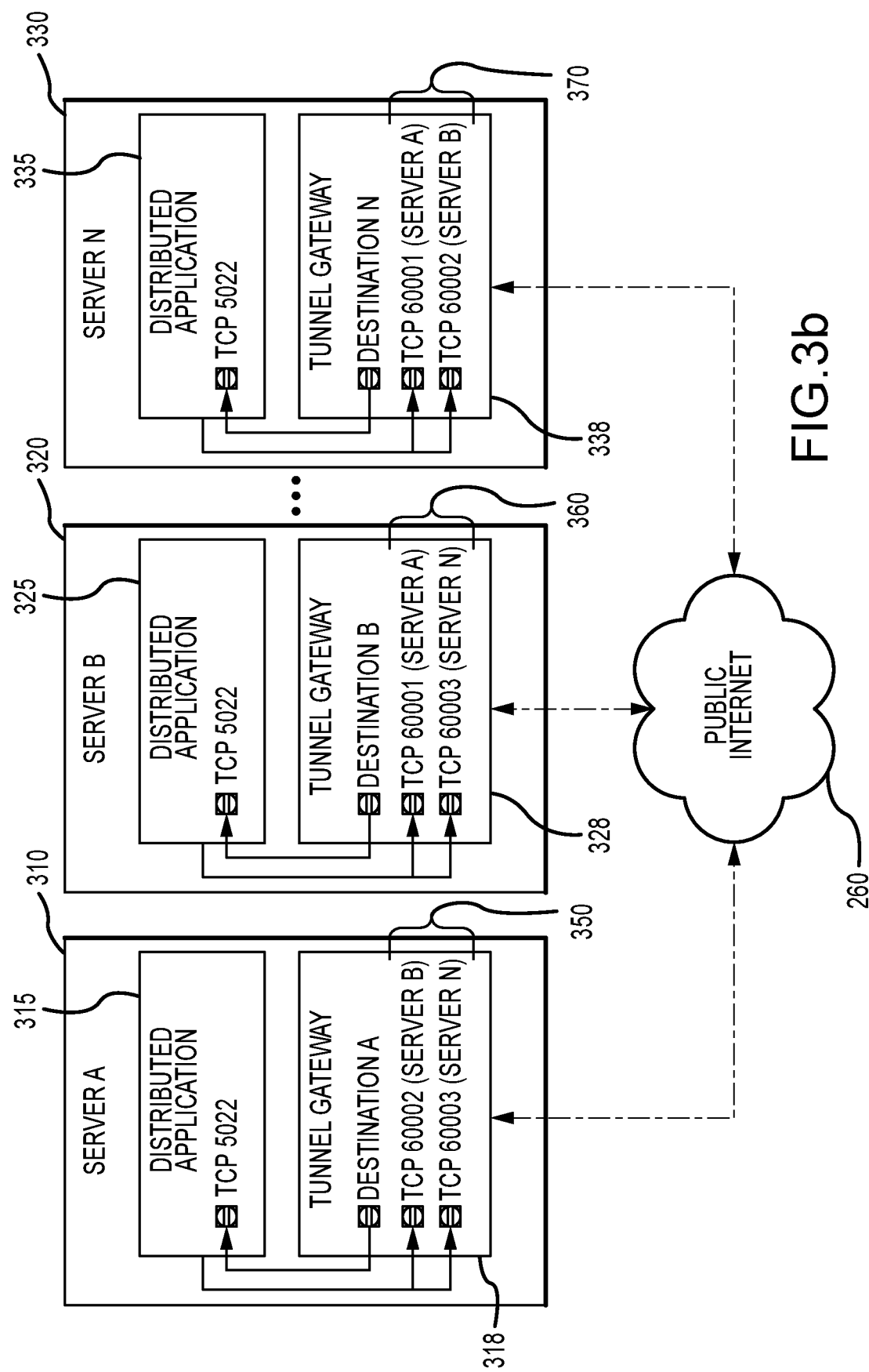
FIG. 3b depicts, according to one embodiment of the present invention, a distributed application operating in a server cluster connected indirectly using TCP tunnels.

In the example shown in FIG. 3*b*, the tunnel gateway application component 318, 328, 338 resident on each server 310, 320, 330 establishes a TCP connection via port 5022 with the distributed application instantiation 315, 325, 335 resident on that server. The tunnel gateway application 318, 328, 338 on each server includes a plurality of TCP listeners 350, 360, 370. A TCP listener is associated with each instantiation of the distributed application in the server cluster. Thus for server A 310 the tunnel gateway application 318 provides data received from other instantiations of the application via TCP port 5022. And the distributed application 315 resident on server A 310 dispatches application data to the instantiation of the distributed application 325 resident on server B 320 at TCP listener 60002 and to the distributed application 335 resident on server N 330 at TCP listener 60003. Likewise, the instantiation of the distributed application 325 resident on server B 320 receives data from other instantiations of the application via TCP port 5022. The instantiation of the distributed application 325 resident on server B 320 dispatches application data to the instantiation of the distributed application 315 resident on server A 310 at TCP listener 60001 and to the distributed application 335 resident on server N 330 at TCP listener 60003.

One aspect of the configuration of the TCP tunnels of the present invention is that for each server, one tunnel gateway component runs on that server, and the only components expected to connect to the tunnel gateway's TCP listeners are application(s) also running on that server. Likewise, that tunnel gateway application is one of a limited set of components expected to connect to the application(s) running on that server. For this reason, the invention specifies that tunnel gateway TCP listeners use the IP loopback address (127.0.0.1 or ::1). Recall that a loopback address is a communication channel with only one endpoint. TCP/IP networks specify that a loopback allows client software to communicate with server software on the same computer.

Additionally, tunnel gateway application listening TCP port(s) used for connectivity with peers (TCP 60001, 60002, and 60003 in this example) may also be configured to listen on the loopback address (127.0.0.1.60001 for example). Use of the loopback address for TCP listeners limits connectivity to the local server, and excludes other hosts on any attached networks from accessing these tunnel listeners.

While the present invention is directly applicable to distributed applications that use TCP as their communication method, it leaves open the possibility of supporting a UDP communication channel and any other forms of communication that can be encapsulated. One embodiment of the present invention configures the distributed application to connect to its peers in an automated fashion. The invention may be less applicable to certain distributed applications with components that provide limited configurability of how they connect to other components, i.e. components that do not allow the TCP port to be specified or changed from a default value. Adapting the invention to a specific application may require helper components, e.g. a TCP/UDP translator component.

One embodiment of the present invention dynamically establishes private, secure connectivity for a distributed application, where the servers on which the distributed application is operated are unable to directly address each other by layer-3 Internet protocol. This is typically because the servers are attached to disjoint, geographically distant private internal networks. The present invention facilitates components of the application running on different servers connecting amongst themselves, and provides functionality similar to a VPN, but without having to set up a VPN, or manually configuring the application.

Figure 4A:
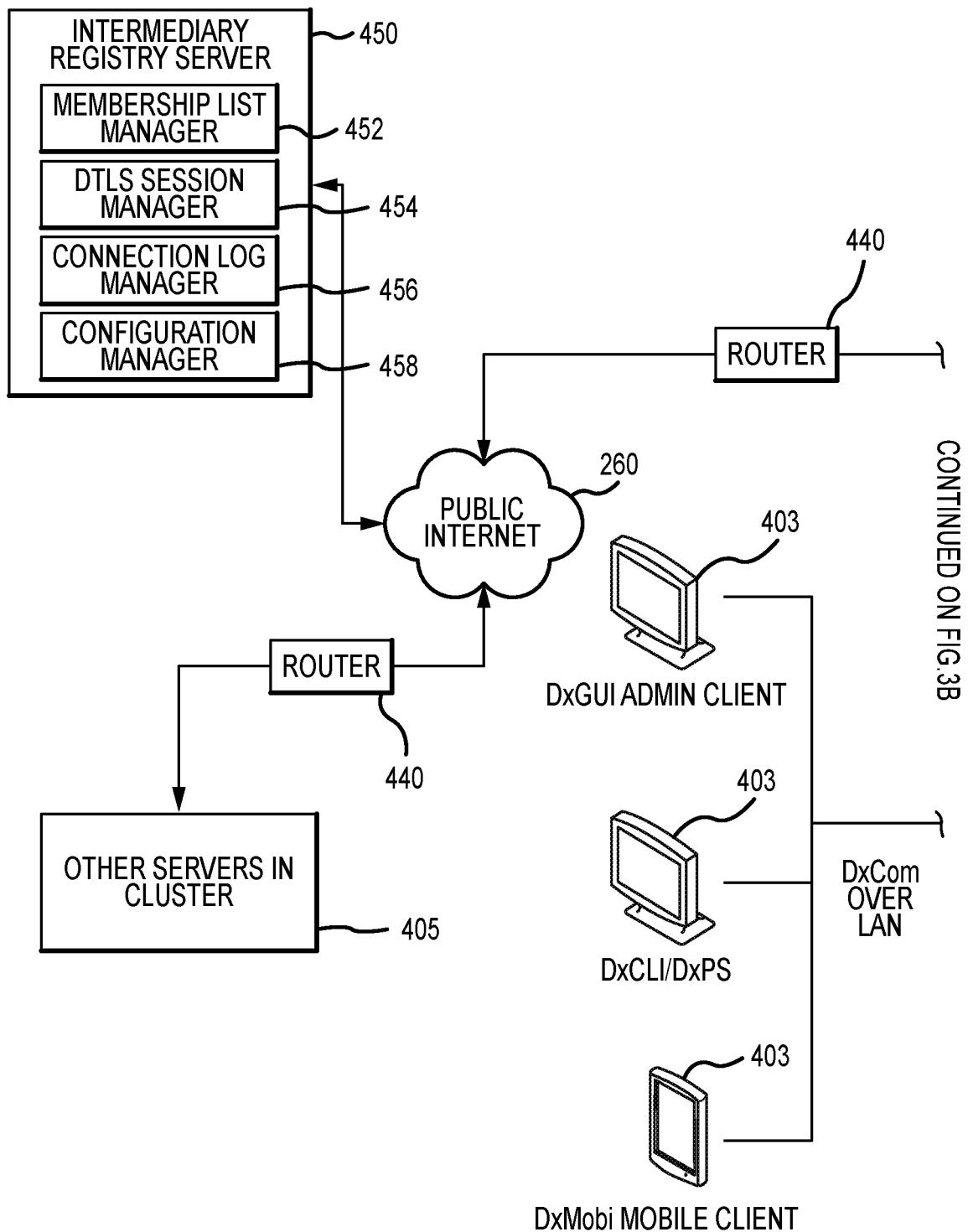
FIGS. 4a and 4b present a system architecture drawing of a distributed server cluster showing various components, engines and modules used to provide terminal control protocol tunneling and exchange of distributed application data via a secure UDP channel, according to one embodiment of the present invention.
Figure 4B:
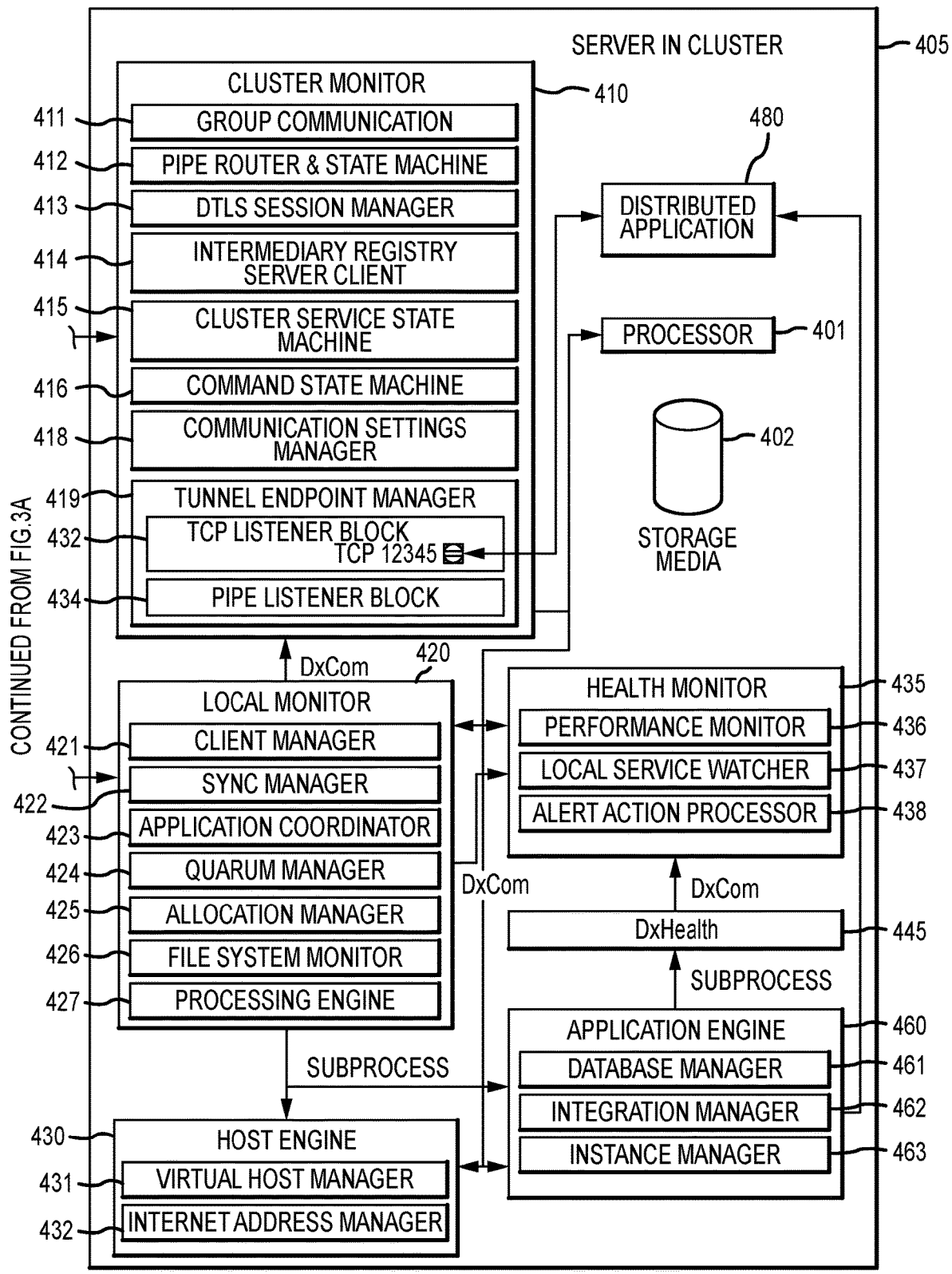

Components of one embodiment of the present invention, including an intermediary registry server 450 coupled to a plurality of servers in a cluster 405, environment is shown in FIGS. 4*a* and 4*b*. Each server 405 within the server cluster includes, among other things, a Cluster Monitor 410, a Local Monitor 420, a Health Monitor 435, a Host Engine 430, an Application Engine 468 and one or more distributed applications 480, as well as a processor (machine) 401 and a non-transitory storage media 402.

The Cluster Monitor 410 of the present invention is responsible for establishing communication between all available servers participating in the tunnel gateway network, monitoring server availability, providing virtual synchrony through its coordinator, monitoring and synchronizing the state of attached service processes (Cluster Services), relaying commands between Cluster Service members, and maintaining tunnel endpoints. The Cluster Monitor 410, as part of forming a group of tunnel gateway servers, elects one specific member of that group to serve as the cluster coordinator. Any server in the group can serve as this role.

As the invention makes it possible to build networks of more than two tunnel gateway servers, the group of tunnel gateway servers will be referred to as a cluster with the primary networking component being the Cluster Monitor 410. To the Cluster Monitor 410, a Cluster Service is any external software component participating in a named group. The Cluster Monitor 410 informs all Cluster Services participating in the same group of each other's presence, and any changes that may occur to that group. The Local Monitor 420 component functions as a Cluster Service to the resident Cluster Monitor 410. Sub-Components of the Cluster Monitor include:

- Group Communication Module 411—Responsible for establishing communication with all available servers involved in the cluster, monitoring server availability and communication channels, and electing a server as the cluster coordinator.
- Pipe Router and State Machine 412—Provides reliable, in-order stream-oriented messaging channels, over datagram-oriented UDP communication channels. The Pipe Router and State Machine manages pipe sockets, both listening sockets and outgoing connections. The communication channels provided by this module are used by the Tunnel Endpoint Manager 419 to establish new tunnel sessions and to exchange data on existing sessions. It is also used internally by other Cluster Monitor components to communicate with other servers. The Pipe Router and State Machine is similar to the TCP module found in most host networking stacks, and performs largely the same function.

DTLS session manager 413—Responsible for establishing authenticated DTLS sessions with other servers in the cluster over UDP.

Intermediary Registry Server Client 414—The Intermediary Registry Server Client manages communication with the Intermediary Registry Server, including NAT configuration discovery, group registrations, and invitations.

Cluster Service State Machine 415—The Cluster Service State Machine monitors availability of Cluster Services, processes changes to the set of available Cluster Services, and informs active Cluster Service components running on each system of the current service membership.

Command State Machine 416—Responsible for monitoring the state of relay commands submitted by various Cluster Services. The Command State Machine ensures consistent ordering of relayed commands, and that reliable responses are sent back to the issuers of those commands.

Communication Settings Manager 418—The Communication Settings Manager maintains administratively configured details of the cluster, including the list of systems, their network addresses, and cryptographic secrets. The Communication Settings Manager is responsible for managing the process of adding and removing systems in an active cluster.

Tunnel Endpoint Manager 419—Responsible for creating, altering, or removing tunnel redirector endpoints based on global configuration. The Tunnel Endpoint Manager ensures that the tunnel configuration is synchronized between servers, processes updates to the global tunnel configuration, and manages two different types of tunnel endpoints:

TCP Listener Block 432—The TCP Listener Block listens on a TCP socket. For each newly accepted connection, the TCP Listener Block will initiate a pipe connection to a preconfigured address. Upon successful connection, all data received from the accepted TCP socket will be forwarded to the pipe socket, and vice versa.

Pipe Listener Block 434—The Pipe Listener Block listens on a pipe socket. For each newly accepted connection, the pipe listener block will initiate a TCP connection to a preconfigured address. Upon successful connection, all data received from the accepted pipe socket will be forwarded to the TCP socket, and vice versa.

In the Cluster Monitor 410, the process of configuring a new TCP tunnel with a distributed application (see FIG. 4) includes the following steps:

1. Cluster Group Communication module, acting as the Cluster Coordinator, sends a request to the destination tunnel gateway application server to create a pipe listener block. The pipe listener block is configured to listen on a random pipe port, and connect to the destination target address—the distributed application instantiation on a destination server.
2. The destination tunnel gateway application responds with the pipe port on which the listener block is bound.
3. Cluster Coordinator sends requests to all origin tunnel gateway applications to create TCP listener blocks. The TCP listener blocks are configured to connect to each destination tunnel gateway application on the pipe port determined in step (2).

The Local Monitor 420, and its associated sub-components, carry out the clustering aspect of the invention. These can be replaced with any number of similar designs for high-availability application management. In this design of the present invention, the Local Monitor 20 is responsible for receiving and forwarding requests from a user interface to Host Engine 430, Application Engine 460, and Cluster Monitor 410. In one embodiment of the present invention the local monitor includes:

Client Manager 421—Responsible for handling incoming client requests, passing the requests to the Application Coordinator or Processing Engine, and maintaining client connections.

Sync Manager 422—Responsible for maintaining administrative configuration of virtual hosts and applications. Synchronizing configuration between systems as cluster membership changes.

Application Coordinator 423—Responsible for executing cluster-wide administrative commands and maintains cluster invariants related to servers participating in the SQL Server availability groups and other managed applications. For example, if a system fails, and that system was hosting a component of a particular application, the Application Coordinator will ensure that the application is configured to redistribute responsibilities of the failed server.

Quorum Manager 424—The Quorum Manager determines whether the active cluster has a quorum based on configuration settings. The Quorum Manager shuts down active applications if a quorum does not exist. For example, if two sub-groups of the same cluster are able to communicate among themselves but unable to communicate with one another, they will form two independent clusters. The Quorum Manager ensures that only one of those clusters attempts to start applications.

Allocation Manager 425—Responsible for monitoring the set of applications active on each system, and guiding automatic application placement decisions based on configured resource requirements and availability.

File System Monitor 426—The File System Monitory monitors the availability of file system paths for applications, and reporting state to the cluster coordinator.

Processing Engine 427—The Processing Engine parses and carries out client requests by forwarding the requests to Host Engine, Application Engine, and/or Sync Manager.

The Application Engine 460 is responsible for establishing and managing the distributed application. It includes:

Database Manager 461—Responsible for maintaining and managing instance database files per [SQL Server] application instance.

Instance Manager 463—Responsible for maintaining and managing instance configuration stored on disk. Manages configuration of distributed application, including configuring connectivity and the use of TCP tunnels to connect to peers.

Integration Manager 462—Responsible for handling instance registration with Registry and Health Monitor.

The Host Engine 430 establishes and maintains virtual hosts and virtual IP addresses. Sub-Components of the Host Engine include:

Virtual Host Manager 431—Responsible for maintaining and managing virtual hosts.

Internet Address Manager 432—Responsible for managing virtual IP address subscriptions A Health Monitor 435 monitors the health of an application running on the server and signals a failover or failback event. Each Health Monitor includes:

Performance Monitor 436—Responsible for monitoring CPU, memory, and I/O utilization of the system and the relevant application processes.

Local Service Watcher 437—Responsible for monitoring application health and raising events based on registration policy.

Alert Action Processor 438—Responsible for sending emails and invoking scripts in response to alerts and application conditions.

Included in the description are flowcharts depicting examples of the methodology which may be used to communicate among distributed applications using TCP tunnels. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 5:
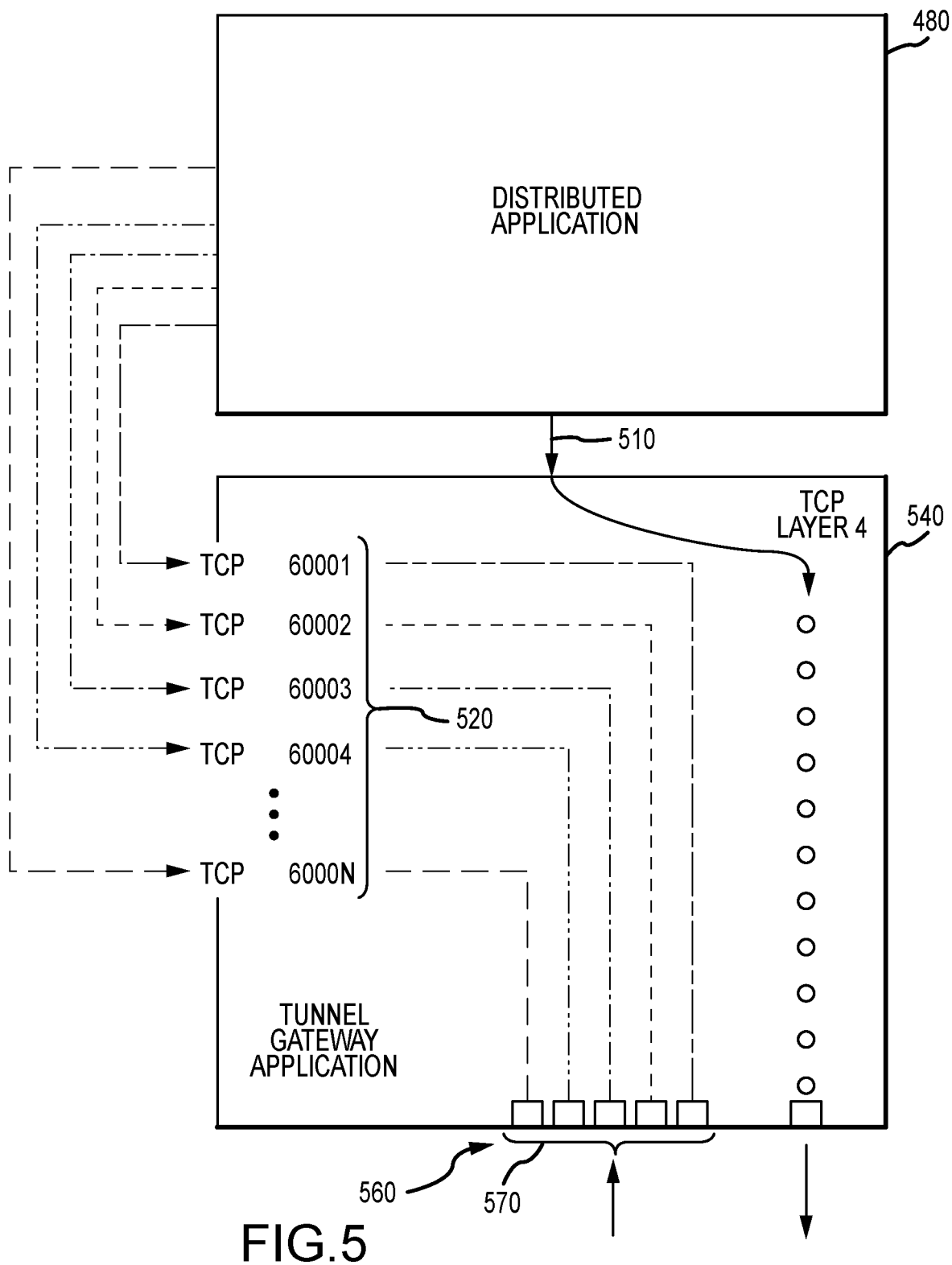
FIG. 5 is a network flow diagram of a process for terminal control protocol tunneling and client application data forwarding via a secure UDP channel, according to one embodiment of the present invention.
Figure 6:
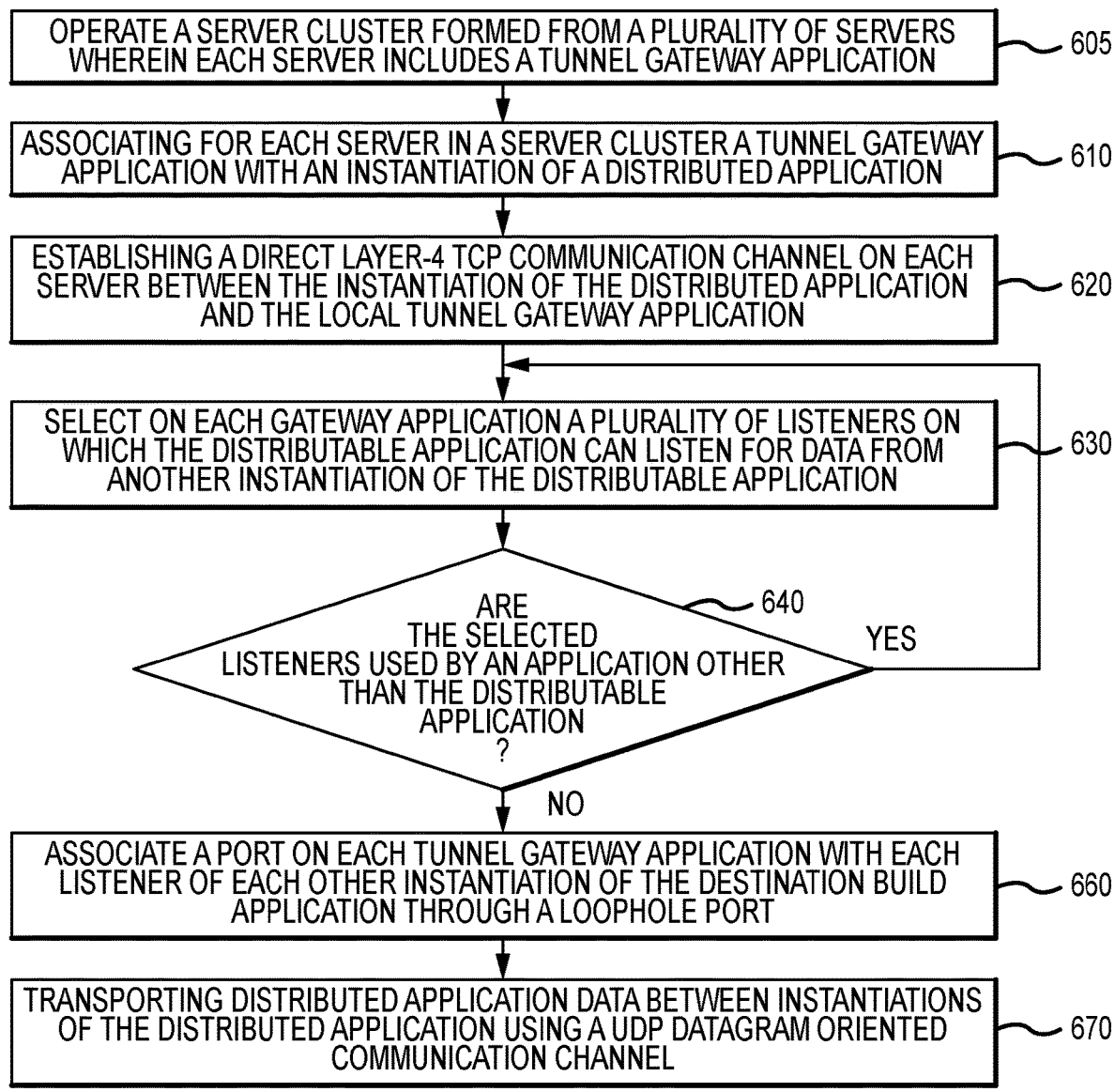
FIG. 6 is a flowchart for a methodology for terminal control protocol tunneling and forwarding of client application data, according to one embodiment of the present invention.

One methodology of the present invention (as shown with additional detail in FIG. 5 and FIG. 6) is abstracted into the following steps:

1. Operate 605 a server cluster formed from a plurality of servers 405 wherein each server includes a tunnel gateway application 225 and each includes a plurality of Terminal Control Protocol (TCP) listeners.
2. Determine the connectivity paths of the distributed application, including which components have TCP listeners, and which components connect to which listeners.
    a. Associate 610 on each server on which an instantiation of the distributed application exists, the distributed application with a resident tunnel gateway application.
    b. Establish 620 a direct TCP layer-4 connection 510 between the distributed application and the resident tunnel gateway application on each server in the server cluster
3. For each connector/listener pair, associate 660 a new tunnel with an origin TCP listener on the origin tunnel gateway application operating on the server of the connecting instantiation of the distributed application, routed through a destination tunnel gateway application 540 operating on the server of the listening application.
    a. When selecting 630 a TCP listener 520 for each tunnel origin point, ensure 640 that the listener is not in use by any other applications running on the server.
    b. If the application requires that all components have identical configuration, and the configuration describes an address and TCP port to use to reach a specific member of the group, the selection of a listening port 560 for the tunnel origins becomes more complex. The same listening port must be used for all tunnel origins used to connect to that specific peer, and therefore the port chosen must be available and unused by other applications on all servers where those tunnel origins are required.
4. Reconfigure each participating application component to connect to the origin tunnel gateway's TCP listener instead of the destination application listener.
5. Transport 670 distributed application data between instantiations of the distributed application using a UDP datagram-oriented communication channel 570.

The present invention supports the operation of TCP tunnels for use by this application or set of applications. TCP tunnels allow Distributed Application components to connect to one another through incongruent networks, such as across NAT routers and the public Internet, without opening access to the public Internet. The Application Engine Instance Manager is responsible for applying configuration to this component, including settings to cause the distributed application to use the TCP tunnels.

In addition to servicing TCP tunnels, the ordered, reliable communication channels provided by the Pipe Router and State Machine of the present invention provide the necessary data for operation of components internal to the Cluster Monitor, such as the Cluster Service State Machine and the Command State Machine. A Pipe Router communication channel is used to send commands to other servers in the cluster, to send responses back to command issuers, and to synchronize configuration.

For example, an entry in the Application Coordinator's tunnel configuration table contains:

Destination gateway name—Cluster member that will operate the destination tunnel gateway Destination target address and port—Host to which the destination gateway will establish new tunnel connections One or more origins, including:

Origin gateway name—Cluster member that will operate the origin tunnel gateway

Origin listening address and port—Describes how the listening TCP port for the origin gateway will be created As one of reasonable skill in the relevant art will appreciate the present invention modifies the communication scheme of a distributed application by channeling data through a tunnel gateway application on a local loopback port rather than directly seeking a channel with other instantiations of the distributed application located on a distant server. The challenge becomes mapping the correct ports to access the application and configuring the distributed application to interact with the gateway rather than the distributed application directly. The invention accomplishes this by selecting one or more TCP ports and associating each selected port with one of a plurality of TCP listeners and thereafter routes each associated TCP listener to another instance of the distributed application.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the computer, such as during start-up, is stored in ROM. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the attached claims.

While there have been described above the principles of the present invention in conjunction with intra-application connectivity of distributed applications, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer implemented system for intra-application connectivity of distributed applications over a wide area network, comprising:

a plurality of servers operating as a server cluster wherein each server includes a processor communicatively coupled to a non-transitory storage media tangibly embodying a plurality of instructions wherein the instructions include a tunnel gateway application and wherein each tunnel gateway application includes a plurality of Terminal Control Protocol (TCP) listeners;

a distributed application wherein a separate instance of the distributed application is instantiated on each of the plurality of servers and is communicatively coupled with the tunnel gateway application resident on that server through a direct layer-4 TCP network route, whereby client application data is conveyed to the tunnel gateway application using a TCP transport suitable format and wherein each instantiation of the distributed application is communicatively coupled to each other instantiation of the distributed application via the tunnel gateway application using a TCP listener through a loopback port assigned to the distributed application instance on each server; and a User Datagram Protocol (UDP) datagram-orientated communication channel between each tunnel gateway application.

2. The computer implemented system for intra-application connectivity of distributed applications over a wide area network according to claim 1, wherein each tunnel gateway application is configured to modify client application data from the TCP transport suitable format received from each distributed application instance to a UDP transport suitable format for conveyance over the wide area network.

3. The computer implemented system for intra-application connectivity of distributed applications over a wide area network according to claim 1, wherein each tunnel gateway application is configured to modify client application data received from another tunnel gateway application in the UDP transport suitable format through the wide area network to the TCP transport suitable format for conveyance to the distributed application.

4. The computer implemented system for intra-application connectivity of distributed applications over a wide area network according to claim 1, wherein TCP listeners accept connections from only local instantiations of the distributed application.

5. The computer implemented system for intra-application connectivity of distributed applications over a wide area network according to claim 1, wherein each loopback port at each server is configured to be exclusively available to the instance of the distributed application on that server.

6. The computer implemented system for intra-application connectivity of distributed applications over a wide area network according to claim 1, wherein each application instance is configured to connect with TCP listeners associated with each other of the plurality of servers on which another instance of the distributed application is present.

7. The computer implemented system for intra-application connectivity of distributed applications over a wide area network according to claim 1, wherein the tunnel gateway application includes a tunnel endpoint manager configured to select one or more TCP ports and associate each selected port with one of the plurality of TCP listeners and route each associated TCP listener to the instance of the distributed application resident on each of the plurality of servers in the server cluster forming a unique UDP datagram-orientated communication channel between each peer in the server cluster and thereafter configuring each instance of the distributed application to access peers in the server cluster through each unique UDP datagram-orientated communication channel.

8. A computer implemented method for intra-application connectivity of distributed applications over a wide area network, comprising:

operating a server cluster formed from a plurality of servers wherein each server includes a tunnel gateway application and wherein each tunnel gateway application includes a plurality of Terminal Control Protocol (TCP) listeners;

instantiating on each of the plurality of servers in the server cluster a separate instance of a distributed application wherein each separate instance of the distributed application communicates with the tunnel gateway application resident on that server through a direct layer-4 TCP network route;

conveying client application data between the distributed application instance to the tunnel gateway application on each server using a TCP transport suitable format;

communicatively coupling each instantiation of the distributed application to each other instantiation of the distributed application at each tunnel gateway application using a TCP listener through a loopback port assigned to the application instance on each server; and transporting client application data between each tunnel gateway application over the wide area network through a User Datagram Protocol (UDP) datagram-orientated communication channel.

9. The computer implemented method for intra-application connectivity of distributed applications over a wide area network of claim 8, further comprising modifying, at each tunnel gateway application, client application data from the TCP transport suitable format received from each distributed application instance to a UDP transport suitable format for conveyance over the wide area network.

10. The computer implemented method for intra-application connectivity of distributed applications over a wide area network of claim 8, further comprising modifying, at each tunnel gateway application, client application data received from another tunnel gateway application in the UDP transport suitable format through the wide area network to the TCP transport suitable format for conveyance to the distributed application.

11. The computer implemented method for intra-application connectivity of distributed applications over a wide area network of claim 8, further comprising accepting by TCP listeners connections from only local instantiations of the distributed application.

12. The computer implemented method for intra-application connectivity of distributed applications over a wide area network of claim 8, further comprising configuring each loopback port at each server to be exclusively available to the instance of the distributed application on that server.

13. The computer implemented method for intra-application connectivity of distributed applications over a wide area network of claim 8, further comprising configuring each application instance to connect with TCP listeners associated with each other of the plurality of servers on which another instance of the distributed application is present.

14. The computer implemented method for intra-application connectivity of distributed applications over a wide area network of claim 8, further comprising configuring the tunnel gateway application to select one or more TCP ports and associate each selected port with one of the plurality of TCP listeners and route each associated TCP listener to the instance of the distributed application resident on each of the plurality of servers in the server cluster forming a unique UDP datagram-orientated communication channel between each peer in the server cluster and thereafter configuring each instance of the distributed application to access peers in the server cluster through each unique UDP datagram-orientated communication channel.

15. A non-transitory machine-readable storage medium having stored thereon instructions for intra-application connectivity of distributed applications over a wide area network, comprising machine executable code, which when executed by at least one machine, causes the machine to:

operate a server cluster formed from a plurality of servers wherein each server includes a tunnel gateway application and wherein each tunnel gateway application includes a plurality of Terminal Control Protocol (TCP) listeners;

instantiate on each of the plurality of servers in the server cluster a separate instance of a distributed application wherein each separate instance of the distributed application communicates with the tunnel gateway application resident on that server through a direct layer-4 TCP network route;

convey client application data between the tunnel gateway application on each server using a TCP transport suitable format;

communicatively couple each instantiation of the distributed application to each other instantiation of the distributed application at each tunnel gateway application using a TCP listener through a loopback port assigned to the application instance on each server; and transport client application data between each tunnel gateway application over the wide area network through a User Datagram Protocol (UDP) datagram-orientated communication channel.

16. The non-transitory machine-readable storage medium for claim 15, further comprising machine executable code which causes the machine to modify, at each tunnel gateway application, client application data from the TCP transport suitable format received from each distributed application instance to a UDP transport suitable format for conveyance over the wide area network.

17. The non-transitory machine-readable storage medium for claim 15, further comprising machine executable code which causes the machine to modify, at each tunnel gateway application, client application data received from another tunnel gateway application in the UDP transport suitable format through the wide area network to the TCP transport suitable format for conveyance to the distributed application.

18. The non-transitory machine-readable storage medium for claim 15, further comprising machine executable code which causes the machine to accept by TCP listeners connections from only local instantiations of the distributed application.

19. The non-transitory machine-readable storage medium for claim 15, further comprising machine executable code which causes the machine to configure each loopback port at each server to be exclusively available to the instance of the distributed application on that server.

20. The non-transitory machine-readable storage medium for claim 15, further comprising machine executable code which causes the machine to configure each application instance to connect with TCP listeners associated with each other of the plurality of servers on which another instance of the distributed application is present.

21. The non-transitory machine-readable storage medium for claim 15, further comprising machine executable code which causes the machine to select one or more TCP ports and associate each selected port with one of the plurality of TCP listeners and route each associated TCP listener to the instance of the distributed application resident on each of the plurality of servers in the server cluster forming a unique UDP datagram-orientated communication channel between each peer in the server cluster and thereafter configuring each instance of the distributed application to access peers in the server cluster through each unique UDP datagram-orientated communication channel.

* * * * *